Figure 1:
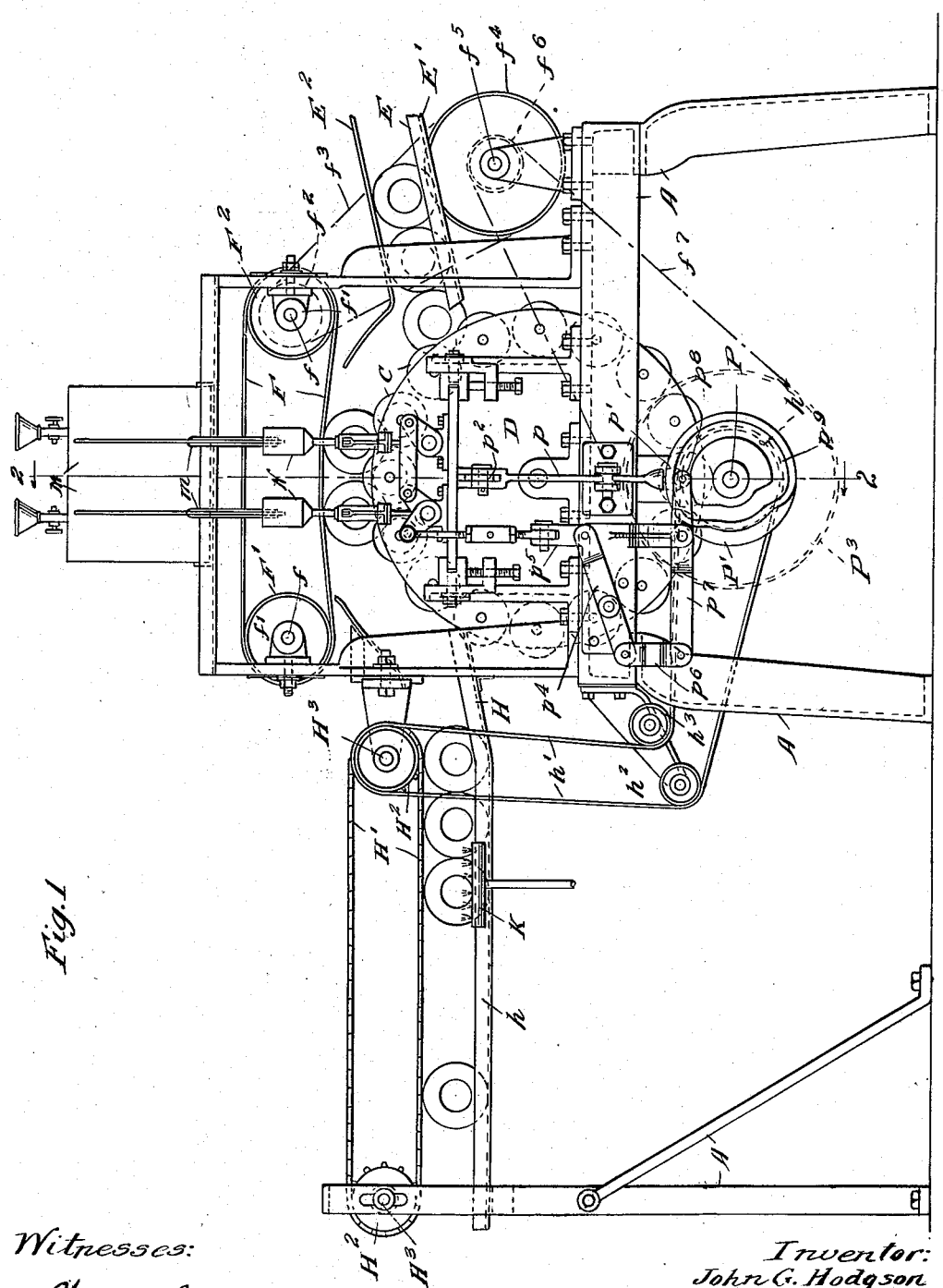

J. G. HODGSON.
CAN COATING OR LACQUERING MACHINE.
APPLICATION FILED MAR. 19, 1908.

932,609.

Patented Aug. 31, 1909.

5 SHEETS—SHEET 1.

Witnesses:
Wm. Geiger
Pearl Abrams.

Inventor:
John G. Hodgson
By Munday, Evarts, Adcock & Clarke
Attorneys

J. G. HODGSON.
CAN COATING OR LACQUERING MACHINE.
APPLICATION FILED MAR. 19, 1908.

932,609.

Patented Aug. 31, 1909.

5 SHEETS—SHEET 2.

Witnesses:
Wm. Geiger
Pearl Abrams

Inventor:
John G. Hodgson
By Munday, Evarts, Adcock & Clarke
Attorneys

J. G. HODGSON.
CAN COATING OR LACQUERING MACHINE.
APPLICATION FILED MAR. 19, 1908.
932,609.
Patented Aug. 31, 1909.
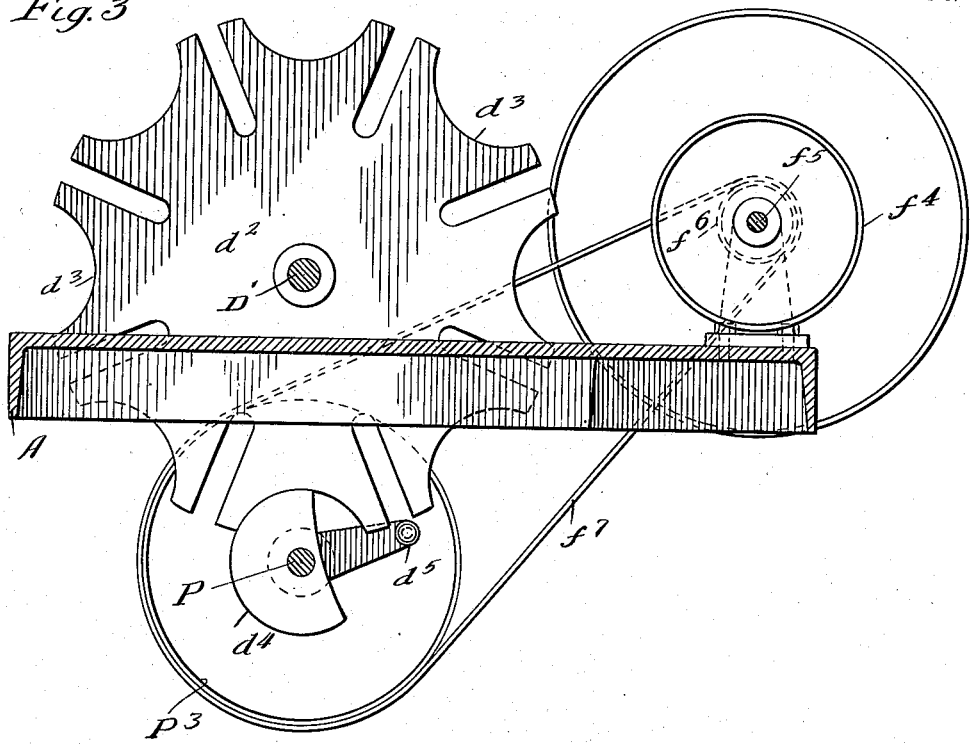
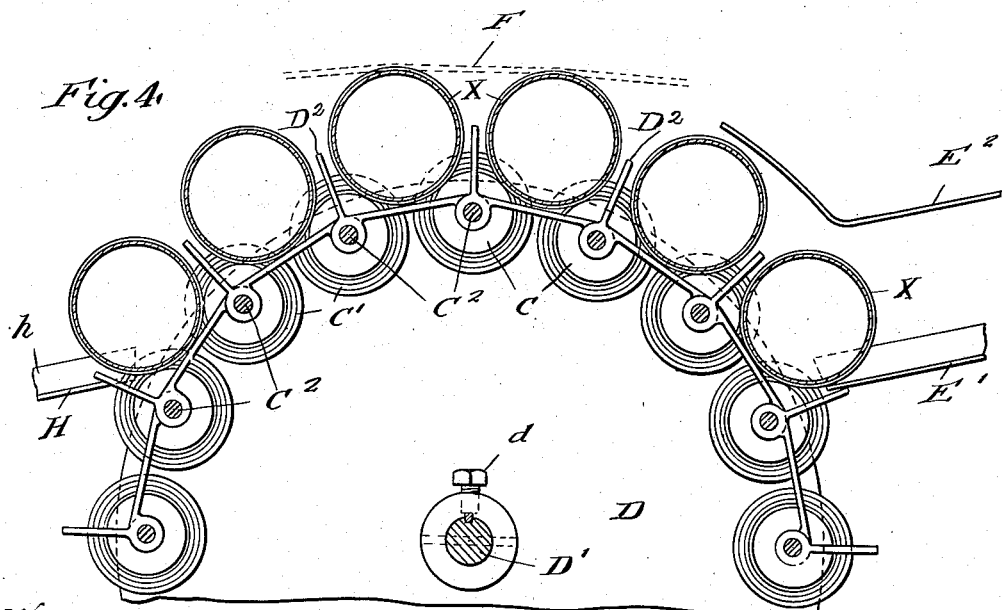
Witnesses:
Wm. Geiger
Pearl Abrams
Inventor:
John G. Hodgson
By Munday, Evarts, Adcock & Clarke
Attorneys J. G. HODGSON.
CAN COATING OR LACQUERING MACHINE.
APPLICATION FILED MAR. 19, 1908.

932,609.

Patented Aug. 31, 1909.

5 SHEETS—SHEET 4.

Witnesses:
Wm. Geiger
Pearl Abrams

Inventor:
John G. Hodgson
By Munday, Evarts, Adcock & Clarke
Attorneys

J. G. HODGSON.
CAN COATING OR LACQUERING MACHINE.
APPLICATION FILED MAR. 19, 1908.
932,609.
Patented Aug. 31, 1909.
5 SHEETS—SHEET 5.
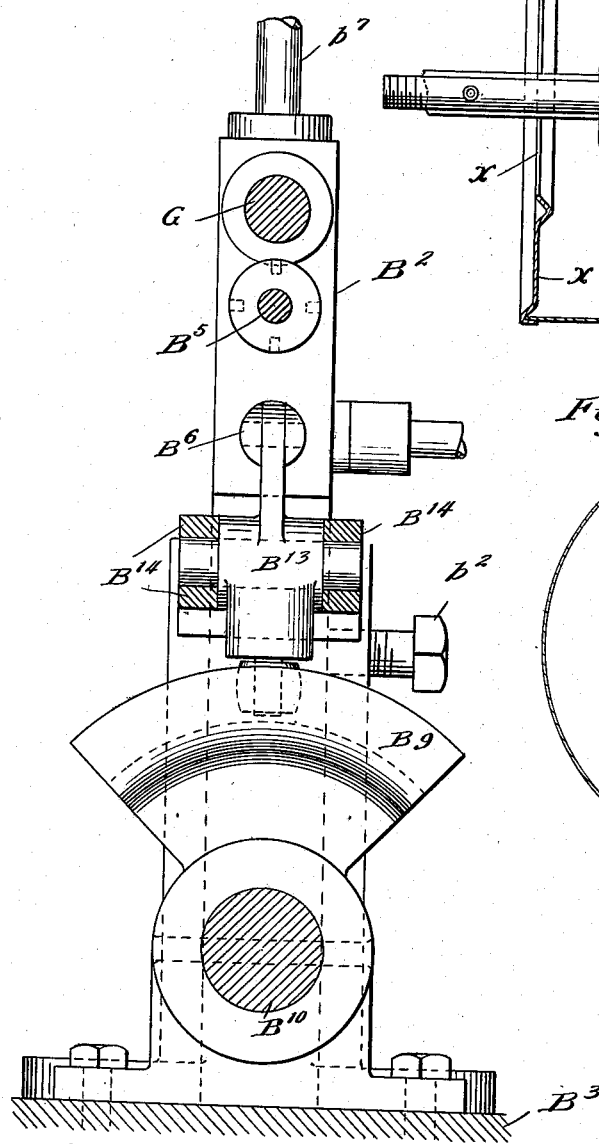
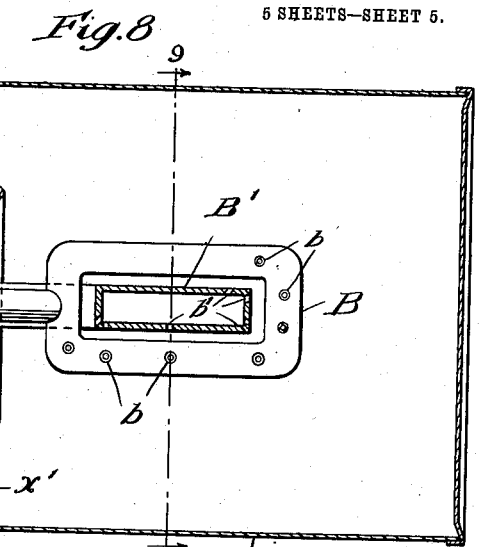
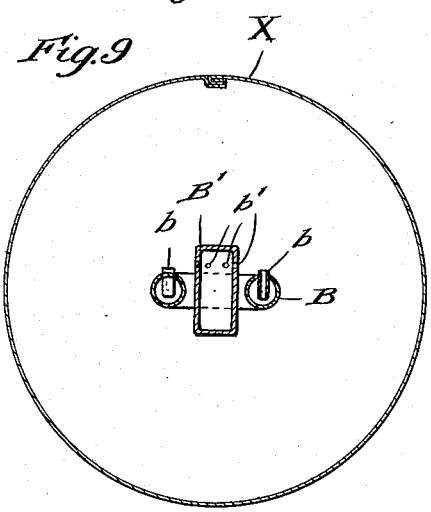
Witnesses:
Wm. Geiger
Pearl Abrams.
Inventor:
John G. Hodgson
By Munday, Evarts, Adcock & Clarke
Attorneys

UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

CAN COATING OR LACQUERING MACHINE.

932,609.  Specification of Letters Patent.  Patented Aug. 31, 1909.

Application filed March 19, 1908. Serial No. 421,966.

*To all whom it may concern:*

Be it known that I, JOHN G. HODGSON, a citizen of the United States, residing in Maywood, in the county of Cook and State of Illinois, have invented a new and useful Improvement in Can Coating or Lacquering Machines, of which the following is a specification.

My invention relates to improvements in machines for lining or coating cans on the inside with liquid lacquer or other protective coating.

The object of my invention is to provide, a simple, efficient and durable machine for automatically, rapidly and cheaply lining or coating sheet metal preserving cans on the inside, uniformly, perfectly and continuously throughout their entire interior surface with a protective coating of lacquer or other material, and by which the liquid lacquer or other coating material may be applied in exact uniform and measured quantities to each can, and by which the lacquer or other protective coating applied to the cans may be quickly made dry, hard, solid and firmly adherent, and also innocuous, tasteless and insoluble in vegetable or food acids or juices, and by which the protective coating may also be rendered capable of successfully withstanding without injury, the heat of the cooking or processing step to which the cans are subjected after being filled, and also the heat of the soldering operation incident to soldering in place the caps that close the filling openings in the cans.

My invention consists in the machine or mechanism I have devised for practically accomplishing this object or result, the same comprising primarily a holder for the cans, a spray head adapted to enter the can at one end either by moving the spray head toward the can or the can toward the spray head, a feed plunger for delivering the liquid lacquer in measured quantities to the spray head as required for coating each can, means for imparting relative rotary movement to the spray head or can, preferably to the can, mechanism for inserting the spray head in the can either by moving the spray head toward the can or the can toward the spray head, preferably by moving the spray head toward the can, a runway or device for delivering the cans to the can holder or holders, a discharge runway for the freshly coated cans, and a gas jet or ignition device for igniting the vapors in and issuing from the freshly coated cans as they move along the runway, and thus flashing and sterilizing the interior of the cans and simultaneously drying, hardening and rendering firmly adherent the liquid lacquer or other protecting coating applied to the interior surface of the can.

My invention further consists in the novel construction of parts and devices and in the novel combinations of parts and devices herein shown or described.

Figure 2:
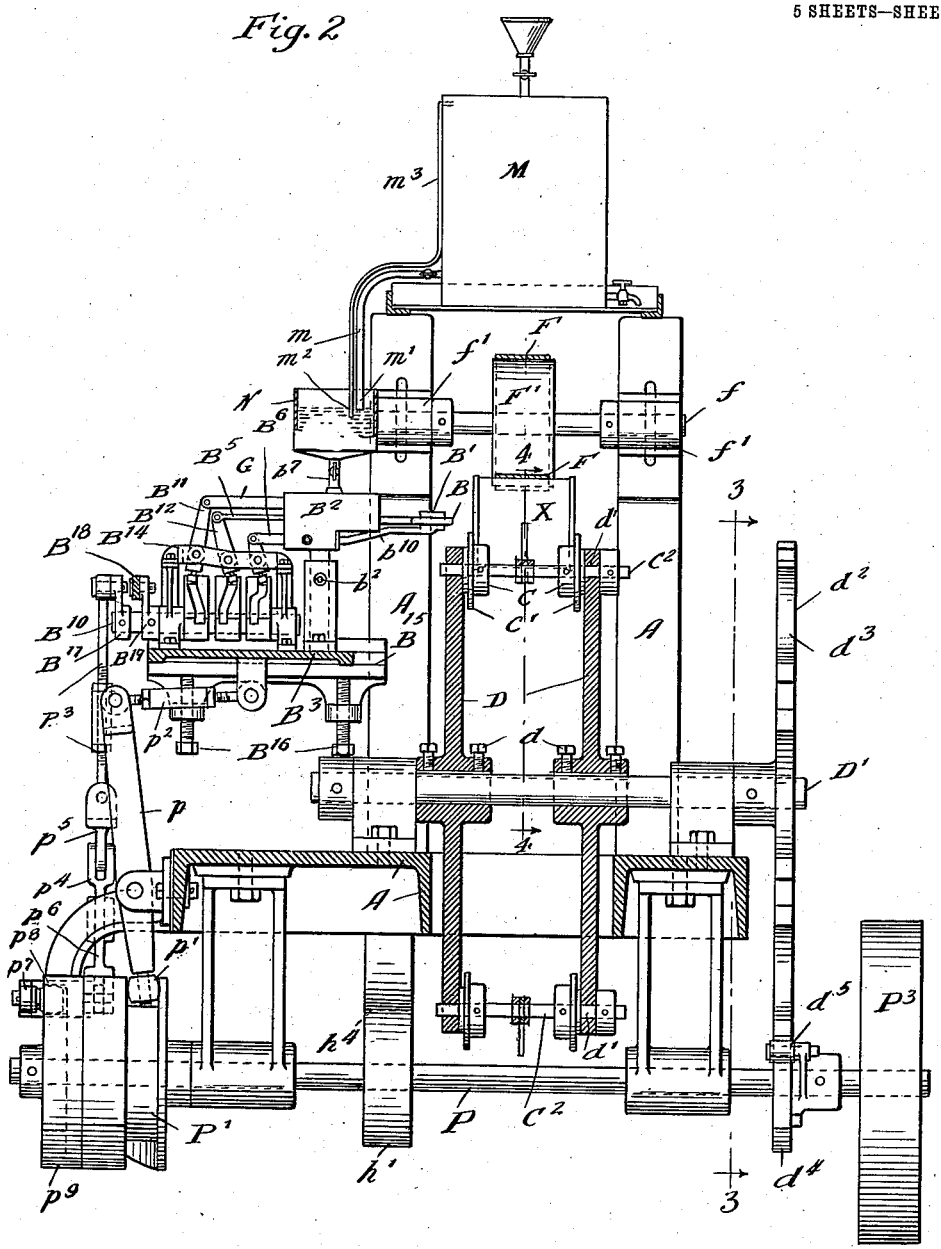
Figure 5:
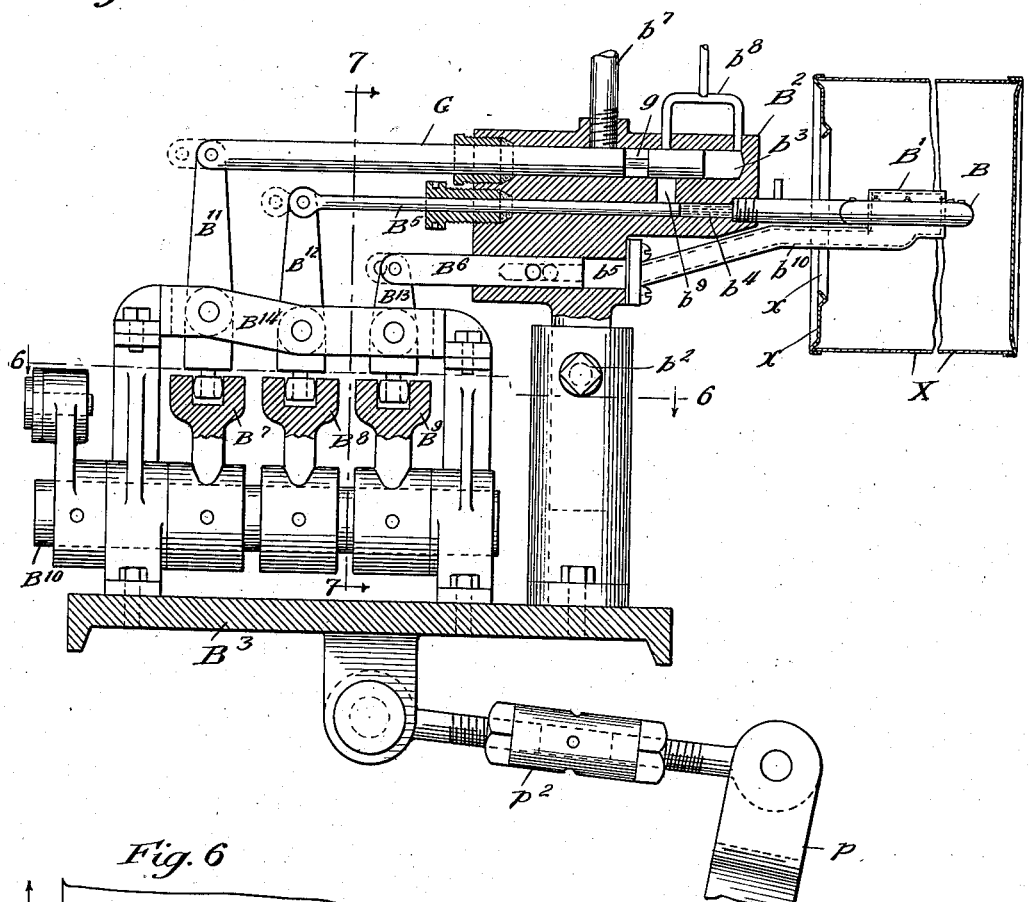
Figure 6:
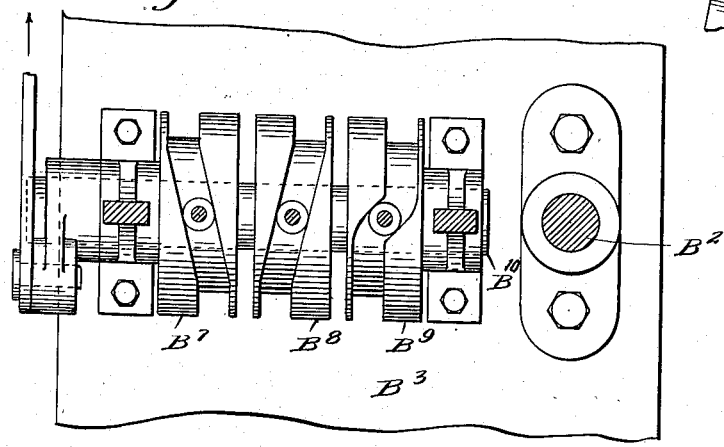

In the accompanying drawing forming a part of this specification, Figure 1 is a side elevation of a machine embodying my invention. Fig. 2 is a central vertical section on line 2—2 of Fig. 1. Fig. 3 is a detail section on line 3—3 of Fig. 2. Fig. 4 is a partial detail section on line 4—4 of Fig. 2. Fig. 5 is an elevation partly in central vertical section of one of the reciprocating spray heads and its connecting mechanism. Fig. 6 is a detail horizontal section on line 6—6 of Fig. 5. Fig. 7 is a detail section on line 7—7 of Fig. 5. Fig. 8 is a detail plan view, partly in horizontal section, of one of the spray heads and showing the can in section. Fig. 9 is a section on line 9—9 of Fig. 8.

In the drawing, A represents the frame of the machine, B the spray head, C the can holders, D the carrier or conveyer upon which the can holders are mounted, E the can feed runway or device for delivering the cans to the can holders, F the can rotating device, G the feed device for the liquid lacquer or coating material, H the discharge runway for the freshly coated cans, K a gas jet or flashing device for igniting the inflammable vapors arising from and issuing from the freshly coated cans, H¹ an endless belt or device for rolling the cans along the discharge runway past the igniting device, M N upper and lower tanks for containing and supplying the liquid lacquer or coating material to the feed plunger or device.

The spray head B is preferably a looped pipe of substantially rectangular form surrounding the compressed air head B¹ which constitutes part of the spray head. The spray head B is preferably furnished with a plurality of upwardly projecting nipples or nozzles *b*, the upper ends of which project slightly above the upper surface of the spray head B, and the lower ends of which extend to near the bottom of the spray head chamber, so that these nipples or nozzles may withdraw substantially all the lacquer or protective coating from the spray head B. The compressed air head $B^1$ is furnished with a series of jet orifices $b^1$ through which blasts of compressed air are directed over the upper end of the jet nipples or nozzles $b$ of the spray head.

The spray head B is removably secured to the spray head holder $B^2$ which is adjustably secured by a clamp screw $b^2$ on the reciprocating slide $B^3$ by which the spray head is moved in and out of the can X through the filling opening $x$ in the head or end $x^1$ of the can. The spray head holder B is furnished with a feed chamber $b^3$ for the feed plunger G and a further chamber $b^4$ for the compressing plunger $B^5$ by which the charge of liquid lacquer or coating material is forced into the spray head, and with a further chamber $b^5$ for the compressed air plunger $B^6$ by which the admission of compressed air to the compressed air head $B^1$ is controlled.

The feed plunger G is furnished with a feed pocket $g$ of a size or capacity to deliver at each stroke of the feed plunger just enough liquid lacquer or other coating for one can, and the stroke of the compressing plunger is also regulated so as to force just the required charge of liquid lacquer or other coating material necessary for one can into each can.

The plungers G, $B^5$ and $B^6$ are automatically reciprocated as required by means of cams $B^7$ $B^8$ $B^9$ on the rock shaft $B^{10}$ which is mounted on the slide $B^3$, and which cams operate said plungers through suitable connecting levers $B^{11}$ $B^{12}$ $B^{13}$ which are fulcrumed on the bar $B^{14}$, carried by the slide $B^3$.

The liquid lacquer or coating material feeds down by gravity from the supplemental supply tank N into the feed chamber $b^3$ and feed plunger pocket $g$ through the connecting pipe $b^7$. The spray head holder $B^2$ is also provided with a vent pipe $b^8$ to prevent air or other fluid being trapped in the end of the feed plunger chamber $b^3$. The spray head holder $B^2$ is further provided with a passage $b^9$ leading from the feed chamber $b^3$ to the compressing chamber $b^4$, through which passage the charge of liquid lacquer or coating material in the pocket $b^4$ of the feed plunger G flows down in front of the compressing plunger $B^5$ by which it is forced into the spray head. The compressed air chamber or cylinder $b^5$ of the spray head holder $B^2$ is connected by a pipe $b^{10}$ with the compressed air head $B^1$, the pipe $b^{10}$ being preferably made integral with said head as indicated in the drawing.

The can holder C may be of any suitable construction adapted to hold the can in coöperative relation with the spray head whether the can or the spray head be the member that is rotated. In that embodiment of my invention wherein the can is the member rotated, as illustrated in the drawing, the can holder is rotatable or of a construction adapted to permit the rotation of the can. The construction of the rotatable can holder C which I prefer to employ consists of a pair of rollers, each preferably furnished with flanges $C^1$ at each end to prevent longitudinal movement of the can in the holder as the spray head is being inserted and removed therefrom. A plurality or series of can holders C, each consisting of a pair of rotatable rollers is preferably employed, the same being mounted on an intermittently movable carrier D, consisting preferably of a pair of wheels or disks secured to the shaft $D^1$. The carrier disks D D may be adjusted farther apart or closer together on their shaft $D^1$, as required to accommodate cans of different lengths, by means of set screws $d$.

The shafts $C^2$ of the can holder rollers C are journaled in suitable holes or bearings $d^1$ in the carrier disks D D. The carrier D may be intermittently rotated to bring the several can holders thereon successively into registry with the spray head B by any suitable mechanism, the same consisting preferably of a Geneva stop mechanism comprising a radially slotted wheel $d^2$ on the carrier shaft $D^1$ having curved stop faces $d^3$, and which wheel engages a coöperating rotating disk and crank pin $d^4$ $d^5$ on the cam shaft P.

The carrier D is preferably furnished with radially projecting arms $D^2$ between adjacent can holder rollers to retain the cans in position between adjacent rollers as the carrier wheel or turret D revolves on its own axis.

The device E for delivering the cans to the can holders automatically preferably consists of an inclined runway having guide flanges $E^1$ and an upper guard rail $E^2$.

Any suitable means may be employed for rotating the can when it is brought into coöperative relation with the spray head. Instead, however, of rotating or driving the can holder rollers C C in order to impart rotary movements to the can, I prefer to combine with the other parts a can rotating mechanism which engages the can itself, as this materially simplifies the construction of the machine. And I have accordingly illustrated in the drawing a can rotating mechanism F operating in this manner, the same consisting preferably of an endless flexible belt F which engages the can when it is brought into registry with the spray head B by movement of the can holder carrier D. The can rotating belt F is mounted upon a pair of pulleys $F^1$ $F^2$, the shafts $f$ of which are journaled in vertically adjustable bearings $f^1$ on the frame of the machine so that the can rotating belt may be adjusted up and down to accommodate cans of different diameters. The shaft $f$ of one of the pulleys $F^2$ is furnished with a pulley $f^2$ to which motion is communicated by a belt $f^3$ from a pulley $f^4$ on the driving shaft $f^5$ having a pulley $f^6$ which gives motion through a belt $f^7$ to pulley $P^3$ on the shaft P.

The liquid lacquer or coating material supply tank M is preferably a tight or hermetically closed tank, and it is furnished with a feed pipe $m$, the lower end $m^1$ of which projects into the supplemental open tank N above the lower end $m^2$ of the air or vent pipe $m^3$ which leads from the upper portion of the closed tank M into the open or supplemental tank N. The lower end $m^2$ of the vent pipe $m^3$ thus automatically controls, regulates or keeps uniform the height or level of the liquid lacquer or coating material in the open or supplemental tank N. When the liquid lacquer or coating material rises in the open or supplemental tank N high enough to seal the lower end $m^2$ of the vent pipe $m^3$, further flow of the liquid from the closed tank M into the open tank N is automatically stopped until the level of the liquid in the open tank N again falls below the lower end $m^2$ of the vent pipe $m^3$.

The discharge device H by which the freshly coated cans are discharged from the can holders and conveyed past the gas jet or igniting device K preferably consists of a runway, the inner end of which is preferably somewhat inclined. The rails of this runway have upright flanges $h$ to guide the cans as they roll along it. To insure proper movement of the cans along the runway, I prefer to provide it with an endless conveyer chain or belt $H^1$ mounted on pulleys $H^2$, the shafts $H^3$ of which are journaled in suitable bearings or supports on the frame of the machine. The shaft of one of these pulleys is preferably driven by a belt $h^1$ traveling on pulleys $h^2$ $h^3$ $h^4$, the latter being on the shaft P.

To flash and sterilize the cans by fire, and also to quickly dry, harden and render firmly adherent the preservative coating applied on the inside thereof, and to free the same from vapors arising from the volatile and inflammable ingredients of the lacquer or preservative coating applied thereto and consequent injury to workmen or danger of fire, and also to eliminate from the interior coatings of the cans all taste, odor or flavor that might otherwise exist from the coatings, I mount adjacent to the can runway H a gas jet or other igniting device K so that as each can passes the gas jet on the runway the vapors in the can and issuing therefrom will be flashed, exploded and burned.

The spray head slide $B^3$ reciprocates in suitable guides $B^{15}$ which are adjusted up and down on the frame of the machine to accommodate cans of different diameters by adjusting screws $B^{16}$. The spray head slide or carriage $B^3$ is reciprocated as required by means of a cam $P^1$ on the shaft P through the lever $p$, carrying a roller $p^1$, and which is connected by an adjustable link $p^2$ with the spray head slide $B^3$.

The rock shafts $B^{10}$ which carry the several cams $B^7$ $B^8$ $B^9$ that actuate the several plungers in the spray head holder $B^2$ are automatically rocked at intervals by means of a reciprocating bar $B^{18}$ on the arms $B^{19}$ of said rock shafts $B^{10}$, and which bar $B^{18}$ is actuated by means of an arm $B^{17}$ connected by a link $p^3$ with a bent lever $p^4$ having a swivel joint $p^5$ at one end and a link $p^6$ at the other end connecting with a lever $p^7$ having a roller $p^8$ which travels in the cam $p^9$ on the shaft P.

Each pair of plungers in the two spray head holders are thus operated in unison so that the two cams are simultaneously sprayed. The feed plunger G is first moved forward to bring its feed pocket $g$ into register with the passage $b^9$ so that the measured charge of liquid lacquer or other coating material may feed down in front of the compressing plunger $B^5$ by which the lacquer or coating material is forced into the spray head. The air piston or plunger $B^9$ then operates as a valve to open the compressed air communication between the compressed air supply and the compressed air head B, and then immediately the compressing plunger moves forward and forces the charge of lacquer or liquid coating material into the spray head so that the jets of air issuing through the air orifices $b^1$ over the upper ends of the jet nozzles $b$ will suck the liquid lacquer out of the spray head, and, dividing it into a fine spray, project it against the interior surface of the rotating can.

I claim:—

1. In an automatic machine for coating the inside of cans with lacquer or protective material, the combination with a plurality of rotatable can holders, an intermittently movable carrier upon which said holders are mounted, a runway for delivering the cans to the holders, means for successively rotating the cans in the holders, a longitudinally reciprocating spray head adapted to enter the can mouth or opening, and having a compressed air head, a closed supply tank for the liquid lacquer or coating material, a supplemental open tank from which the liquid lacquer or coating material is fed to the spray head, a spray head holder having a feed chamber, a feed plunger, a compressing chamber, a compressing plunger, an air chamber and an air plunger, a reciprocating slide for operating said spray head holder, a discharge runway and a flame jet for flashing or igniting and sterilizing the freshly coated cans as they roll along the discharge runway, substantially as specified.

2. The combination with a can holder, of a spray head adapted to enter the mouth or opening of the can, means for bringing the spray head and can in said can holder into coöperative relation with each other with the spray head inside the can, means for rotating one of said parts, the can or spray head in respect to the other, means for automatically delivering the cans to said holder and a flame jet for flashing or igniting the vapors in and issuing from the freshly coated cans, substantially as specified.

3. The combination with a can holder and means for rotating the can, of a reciprocating spray head adapted to enter the mouth or opening of the can, means for automatically delivering the cans to said holder, a discharge runway for the freshly coated cans and a flame jet for flashing or igniting the vapors in and issuing from the freshly coated cans, substantially as specified.

4. The combination with a can coating mechanism comprising a spray head and means for rotating the cans in respect to the spray head, of a device for igniting or flashing the freshly coated cans, substantially as specified.

5. The combination with a can coating mechanism comprising a spray head and means for rotating the cans in respect to the spray head, of a device for igniting or flashing the freshly coated cans and means for conveying the freshly coated cans past the igniting device, substantially as specified.

6. The combination with a can coating mechanism comprising a spray head and means for rotating the cans in respect to the spray head, of a device for igniting or flashing the freshly coated cans, and a runway for conveying the cans past the igniting device, substantially as specified.

7. In an automatic machine for coating the inside of cans with lacquer or protective material, the combination with a plurality of rotatable can holders, an intermittently movable carrier upon which said holders are mounted, a runway for delivering the cans to the holders, means for successively rotating the cans in the holders, a longitudinally reciprocating spray head having a compressed air head, and a plurality of jet nozzles and compressed air orifices, a feed tank for the liquid lacquer, a spray head holder having a feed plunger for the liquid lacquer, a plunger for forcing the liquid lacquer into the spray head, a piston for controlling the supply of compressed air to the compressed air head of the spray head, and a reciprocating slide for operating said spray head holder, substantially as specified.

8. In an automatic machine for coating the inside of cans with lacquer or protective material, the combination with a plurality of rotatable can holders, an intermittently movable carrier upon which said holders are mounted, a runway for delivering the cans to the holders, means for successively rotating the cans in the holders, a longitudinally reciprocating spray head having a compressed air head, and a plurality of jet nozzles and compressed air orifices, a feed tank for the liquid lacquer, a spray head holder having a feed plunger for the liquid lacquer, a plunger for forcing the liquid lacquer into the spray head, a piston for controlling the supply of compressed air to the compressed air head of the spray head, a reciprocating slide for operating said spray head holder, and a discharge runway for the freshly coated cans, substantially as specified.

9. In an automatic machine for coating the inside of cans with lacquer or protective material, the combination with a plurality of rotatable can holders, an intermittently movable carrier upon which said holders are mounted, a runway for delivering the cans to the holders, means for successively rotating the cans in the holders, a longitudinally reciprocating spray head having a compressed air head, and a plurality of jet nozzles and compressed air orifices, a feed tank for the liquid lacquer, a spray head holder having a feed plunger for the liquid lacquer, a plunger for forcing the liquid lacquer into the spray head, a piston for controlling the supply of compressed air to the compressed air head of the spray head, a reciprocating slide for operating said spray head holder, a discharge runway for the freshly coated cans and a flame device for flashing or igniting and sterilizing the freshly coated cans as they pass on the discharge runway, substantially as specified.

10. The combination with a can runway, of an intermittently movable carrier, a series of can holders on said carrier, means for successively rotating the cans, a reciprocating spray head, means for feeding or supplying the liquid coating material to said spray head, a discharge runway for the cans and an igniting device for flashing and sterilizing the freshly coated cans, substantially as specified.

11. The combination with oppositely moving devices for supporting and rotating the cans, of a spray head, means for bringing the can and spray head into operative relation with the spray head inside the can, an igniting device for flashing the freshly coated cans, and means for directing the freshly coated cans past the flashing device, substantially as specified.

12. The combination with oppositely moving devices for supporting and rotating a can, of a spray head, means for bringing the can and spray head into operative relation with the spray head inside the can, means for feeding or supplying liquid coating material to the spray head, a can delivery device, a can discharge device and a flashing or igniting device, substantially as specified.

13. The combination with oppositely moving devices between and by which the can is supported and rotated, of a reciprocating spray head, a can discharge device and a can flashing or igniting device, substantially as specified.

14. The combination with a can supporting means, of a spray head, means for bringing the can and spray head into operative relation with the spray head inside the can, means for imparting relative rotation between the spray head and can, an open feed tank for the liquid coating material, a closed supply tank and means for maintaining the liquid coating material at a constant level in the feed tank, substantially as specified.

15. The combination with can supporting means, of a spray head, means for bringing the can and spray head into operative relation with the spray head inside the can, means for imparting relative rotation between said spray head and can, an open feed tank for the liquid coating material, a closed supply tank, a feed pipe and a vent or air pipe connecting said feed tank and closed supply tank, substantially as specified.

16. The combination with can supporting means, of a spray head, means for bringing the can and spray head into operative relation with the spray head inside the can, means for imparting relative rotation between said spray head and can, an open feed tank for the liquid coating material, a closed supply tank, a feed pipe and a vent or air pipe connecting said feed tank and closed supply tank, the lower end of said feed pipe projecting into said feed tank below the lower end of said vent pipe, substantially as specified.

17. In a can coating machine, the combination with a pair of rotatable can holding rollers, of a coöperating can-contacting belt for axially rotating a can on said can holding rollers, a reciprocating spray head for applying coating material to the interior surface of the rotating can, and a runway for delivering the cans to said can holding rollers, substantially as specified.

18. In a can coating machine, the combination with a pair of rotatable can holding rollers, of a coöperating belt for rotating a can on said can holding rollers, a reciprocating spray head for applying coating material to the interior surface of the rotating can, and a runway for delivering the cans to said can holding rollers, and an igniting device for flashing and sterilizing the freshly coated cans, substantially as specified.

19. In a can coating machine, the combination with a pair of rotatable can holding rollers, of a coöperating can-contacting belt for axially rotating a can on said can holding rollers, a reciprocating spray head for applying coating material to the interior surface of the rotating can, a runway for delivering the cans to said can holding rollers and a can discharge runway, substantially as specified.

20. In a can coating machine, the combination with a pair of rotatable can holding rollers, of a coöperating belt for rotating a can on said can holding rollers, a reciprocating spray head for applying coating material to the interior surface of the rotating can, a runway for delivering the cans to said can holding rollers, a can discharge runway and an igniting device, substantially as specified.

21. In a can coating machine, the combination with an intermittently rotating carrier, of a plurality of can holding rollers thereon, a continuously moving can-contacting belt for axially rotating the cans on said can holding rollers, a can delivery runway, and a plurality of reciprocating spray heads adapted to enter the cans, substantially as specified.

22. In a can coating machine, the combination with an intermittently rotating carrier, of a plurality of can holding rollers thereon, a continuously moving can-contacting belt for axially rotating the cans on said can holding rollers, a can delivery runway, a plurality of reciprocating spray heads adapted to enter the cans and a can discharge runway, substantially as specified.

23. In a can coating machine, the combination with an intermittently rotating carrier, of a plurality of can holding rollers thereon, a continuously moving belt for rotating the cans on said can holding rollers, a can delivery runway, a plurality of reciprocating spray heads adapted to enter the cans and a can discharge runway and an igniting device adjacent to said discharge runway, substantially as specified.

24. In a machine for spraying the interior of cans with lacquer or coating material, the combination with an intermittently moving carrier, of a plurality of rotatable can holders thereon and a plurality of reciprocating spray heads spaced relatively to said can holders and adapted to enter the cans and means for axially rotating the cans in said holders, substantially as specified.

25. In a machine for spraying the interior of cans with lacquer or coating material, the combination with an intermittently moving carrier, of a plurality of rotatable can holders thereon, a plurality of reciprocating spray heads spaced relatively to said can holders and adapted to enter the cans and means for axially rotating the cans in said holders and a can delivery runway, substantially as specified.

26. In a machine for spraying the interior of cans with lacquer or coating material, the combination with an intermittently moving carrier, of a plurality of rotatable can holders thereon, a plurality of reciprocating spray heads spaced relatively to said can holders and adapted to enter the cans and means for axially rotating the cans in said holders, a can delivery runway and a can discharge runway, substantially as specified.

27. In a machine for spraying the interior of cans with lacquer or coating material, the combination with a carrier furnished with a plurality of rotatable can holder rollers thereon, of a coöperating can-contacting belt for axially rotating the cans on said can holders, and a reciprocating spray head adapted to enter the cans, substantially as specified.

28. In a machine for spraying the interior of cans with lacquer or coating material, the combination with a carrier furnished with a plurality of rotatable can holder rollers thereon, of a coöperating can-contacting belt for axially rotating the cans on said can holders, and a reciprocating spray head adapted to enter the cans, said spray head having a plurality of spray jets and a compressed air head having a plurality of jet orifices, substantially as specified.

29. In a machine for spraying the interior of cans with lacquer or coating material, the combination with a carrier furnished with a plurality of rotatable can holder rollers thereon, of a coöperating belt for rotating the cans on said can holders, and a reciprocating spray head adapted to enter the cans, said spray head having a plurality of spray jets and a compressed air head having a plurality of jet orifices and a reciprocating holder for said spray head furnished with a feed plunger, a compressing plunger and a compressed air plunger, substantially as specified.

30. In a machine for spraying the interior of cans with lacquer or coating material, the combination with means for supporting and rotating the can, of a reciprocating spray head, having a plurality of spray jets and a compressed air head having a plurality of jet orifices, of a reciprocating holder for said spray head furnished with a feed plunger for feeding the liquid lacquer or coating material in uniform and measured quantities to the spray head, substantially as specified.

31. In a machine for spraying the interior of cans with lacquer or coating material, the combination with means for supporting and rotating the can, of a reciprocating spray head, having a plurality of spray jets and a compressed air head having a plurality of jet orifices, of a reciprocating holder for said spray head furnished with a feed plunger for feeding the liquid lacquer or coating material in uniform and measured quantities to the spray head, said spray head holder having also a compressing plunger for forcing the liquid lacquer or coating material into the spray head, substantially as specified.

32. In a machine for spraying the interior of cans with lacquer or coating material, the combination with means for supporting and rotating the can, of a reciprocating spray head, having a plurality of spray jets and a compressed air head having a plurality of jet orifices, of a reciprocating holder for said spray head furnished with a feed plunger for feeding the liquid lacquer or coating material in uniform and measured quantities to the spray head, said spray head holder having also a compressing plunger for forcing the liquid lacquer or coating material into the spray head, said spray head holder having also a compressed air piston for controlling the supply of compressed air to said compressed air head, substantially as specified.

33. In a machine for spraying the interior of cans with lacquer or coating material, the combination with means for supporting and rotating the can, of a reciprocating spray head, having a plurality of spray jets and a compressed air head having a plurality of jet orifices, of a reciprocating holder for said spray head furnished with a feed plunger for feeding the liquid lacquer or coacting material in uniform and measured quantities to the spray head, said spray head holder having also a compressing plunger for forcing the liquid lacquer or coating material into the spray head, said spray head holder having also a compressed air piston for controlling the supply of compressed air to said compressed air head and a reciprocating slide furnished with a cam shaft and cams for operating said plungers, substantially as specified.

34. The combination with a can holder, of a spray head adapted to enter the mouth or opening of the can, means for bringing the spray head and the can in said can holder into coöperative relation with each other with the spray head inside the can, means for rotating one of said parts, the can or spray head in respect to the other and a feed plunger for automatically feeding the liquid lacquer or coating material in measured quantity to the spray head, substantially as specified.

35. The combination with a can holder, of a spray head adapted to enter the mouth or opening of the can, means for bringing the spray head and the can in said can holder into coöperative relation with each other with the spray head inside the can, means for rotating one of said parts, the can or spray head in respect to the other and a feed plunger for automatically feeding the liquid lacquer or coating material in measured quantity to the spray head, and a plunger for forcing the measured quantity of lacquer or coating material into the spray head, substantially as specified.

36. The combination with a can holder, of a spray head adapted to enter the mouth or opening of the can, means for bringing the spray head and the can in said can holder into coöperative relation with each other with the spray head inside the can, means for rotating one of said parts, the can or spray head in respect to the other and a feed plunger for automatically feeding the liquid lacquer or coating material in measured quantity to the spray head and means for automatically delivering the can to said can holder, substantially as specified.

37. The combination with a can delivery runway, of a movable carrier, a plurality of rotatable can holders on said carrier, means for axially rotating the cans in said can holders, a spray head adapted to enter the can and having a plurality of jet orifices, a device for feeding the coating material in definite quantities as required for each can to the spray head and means for reciprocating the spray head in and out of the can, substantially as specified.

38. The combination with a can delivery runway, of a movable carrier, a plurality of rotatable can holders on said carrier, means for axially rotating the cans in said can holders, a spray head adapted to enter the can and having a plurality of jet orifices, a device for feeding the coating material in definite quantities as required for each can to the spray head, means for reciprocating the spray head in and out of the can, and a can discharge runway, substantially as specified.

39. The combination with a can delivery runway, of a movable carrier, a plurality of rotatable can holders on said carrier, means for rotating the cans in said can holders, a spray head, a device for feeding the coating material to the spray head, means for reciprocating the spray head in and out of the can, a can discharge runway and an igniting device, substantially as specified.

40. The combination with an intermittently rotating carrier, of a series of rotatable can holders thereon, means for automatically delivering the cans of said holders, a plurality of spray heads spaced relatively to said can holders and adapted to enter the cans and means for axially rotating the cans in said holders, and means for reciprocating said spray heads simultaneously in and out of the cans, substantially as specified.

41. The combination with an intermittently rotating carrier, of a series of rotatable can holders thereon, means for automatically delivering the cans of said holders, a plurality of spray heads spaced relatively to said can holders and adapted to enter the cans and means for axially rotating the cans in said holders, means for reciprocating said spray heads simultaneously in and out of the cans and feed plungers for the spray heads, substantially as specified.

JOHN G. HODGSON.

Witnesses:
PEARL ABRAMS,
WILLIAM A. GEIGER.